Figure 1:
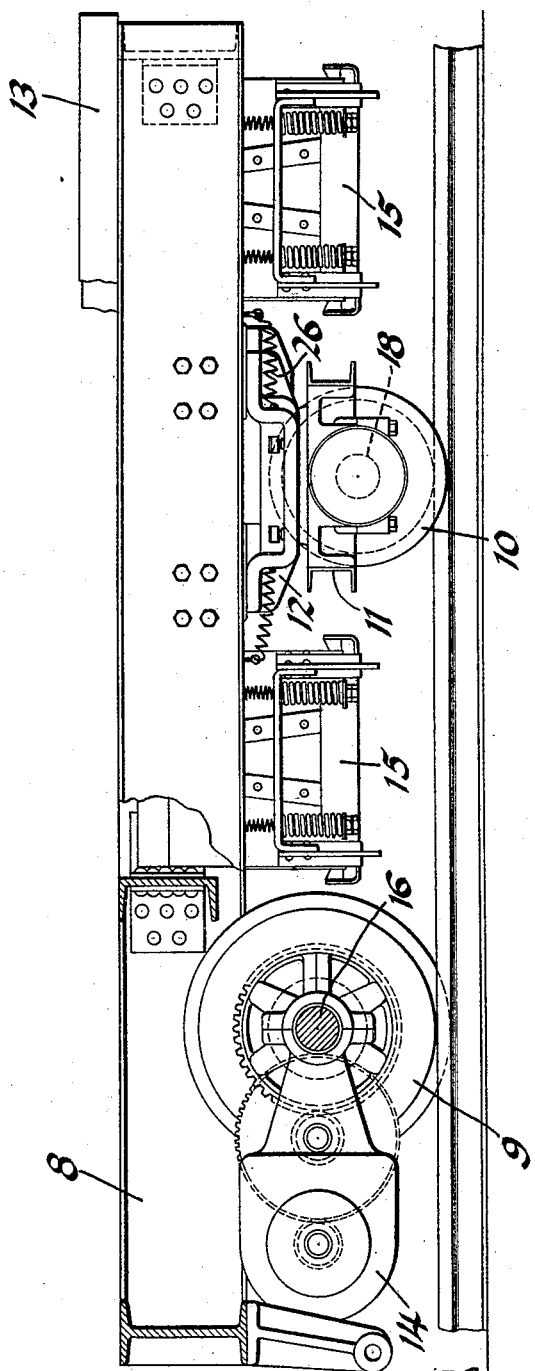

L. H. FLANDERS.
RAIL TRAVERSING TRUCK.
APPLICATION FILED SEPT. 30, 1908.

999,709.

Patented Aug. 1, 1911.
6 SHEETS—SHEET 1.

L. H. FLANDERS.
RAIL TRAVERSING TRUCK.
APPLICATION FILED SEPT. 30, 1908.

999,709.

Patented Aug. 1, 1911.
6 SHEETS—SHEET 5.

WITNESSES:

INVENTOR.
Louis H. Flanders
BY
ATTORNEY IN FACT.

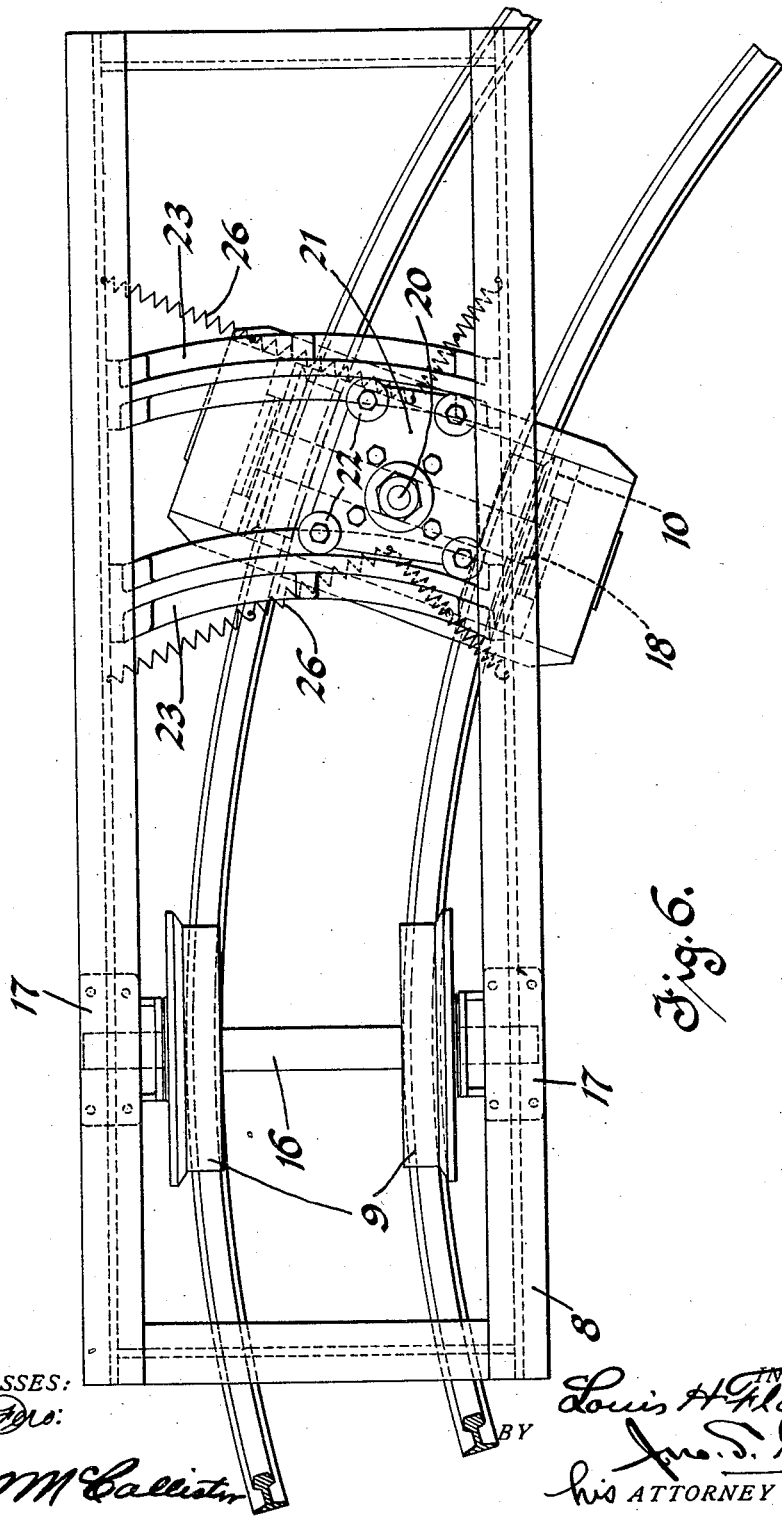

UNITED STATES PATENT OFFICE.

LOUIS H. FLANDERS, OF PITTSBURG, PENNSYLVANIA, ASSIGNOR, BY MESNE ASSIGNMENTS, TO THE ELECTRIC STORAGE BATTERY COMPANY, OF PHILADELPHIA, PENNSYLVANIA, A CORPORATION OF NEW JERSEY.

RAIL-TRAVERSING TRUCK.

999,709.      Specification of Letters Patent.      Patented Aug. 1, 1911.

Application filed September 30, 1908. Serial No. 455,490.

*To all whom it may concern:*

Be it known that I, LOUIS H. FLANDERS, a citizen of the United States, and a resident of Pittsburg, in the county of Allegheny and State of Pennsylvania, have made a new and useful Invention in Rail-Traversing Trucks, of which the following is a specification.

This invention relates to self-propelled rail-traversing trucks and has for an object the production of a four-wheeled truck of large carrying capacity and so constructed that the driving mechanism is located entirely below the freight carrying platform. A further object is the production of a rail-traversing truck of relatively wide wheel bases which will round curves without materially increasing the rolling friction.

These and other objects I attain in an apparatus embodying the features herein described and illustrated in the drawings accompanying this application and forming a part thereof.

Figure 2:
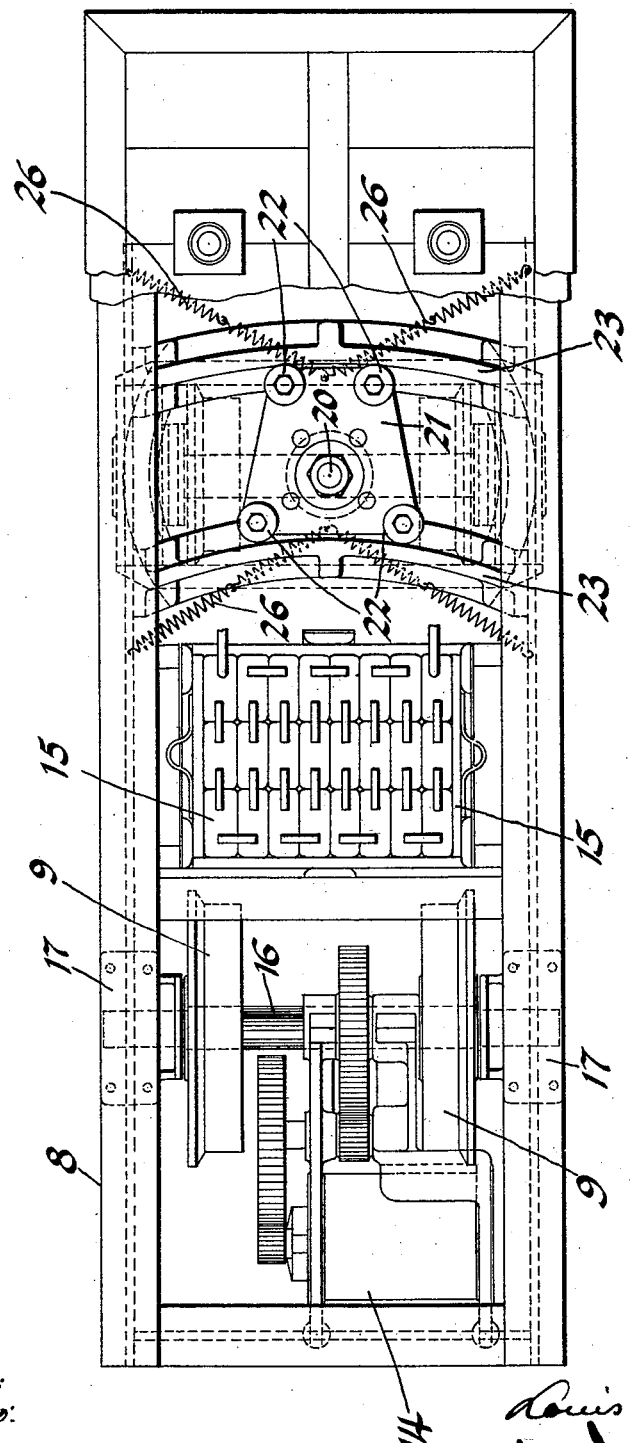
Figure 3:
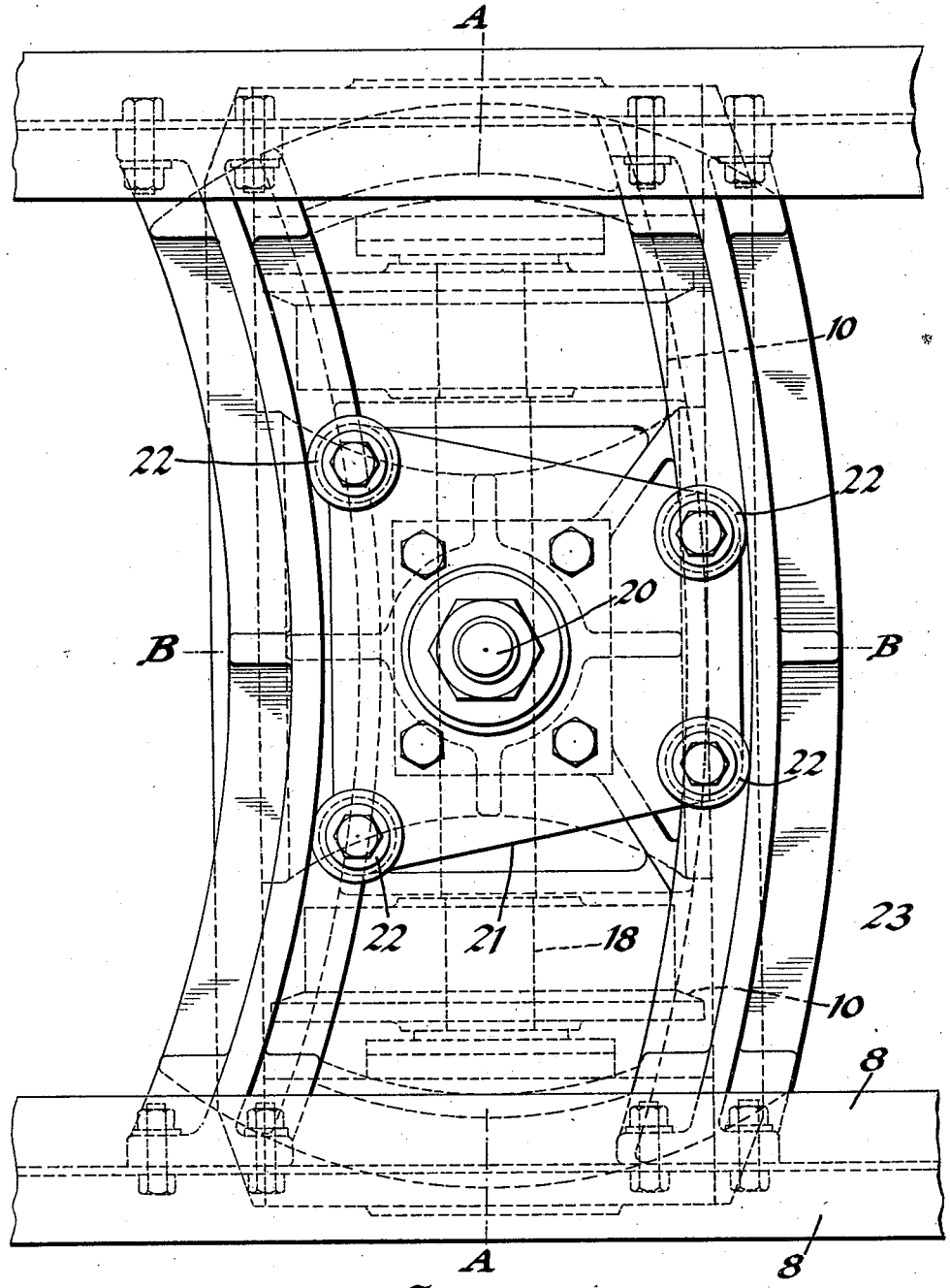
Figure 4:
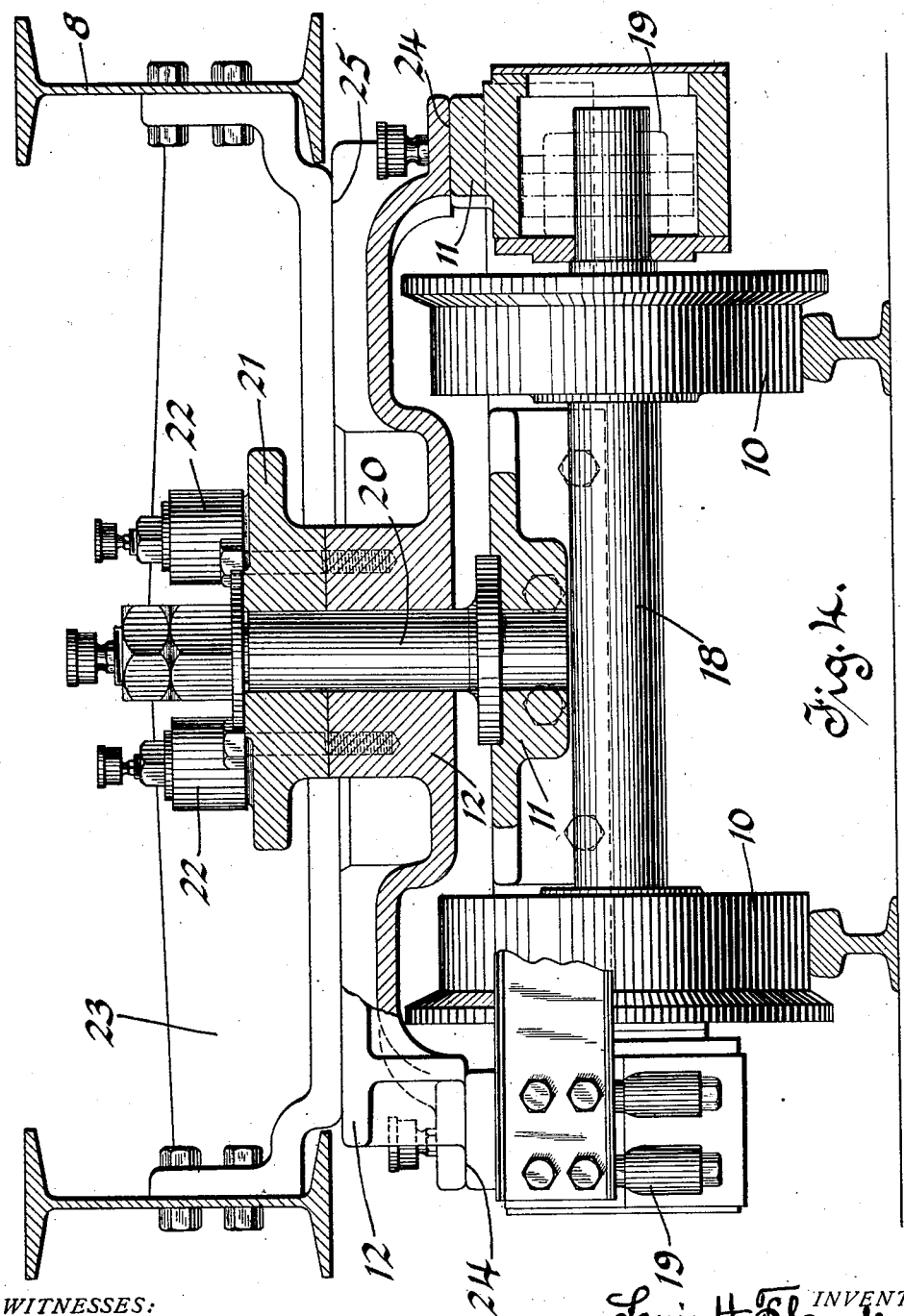
Figure 5:
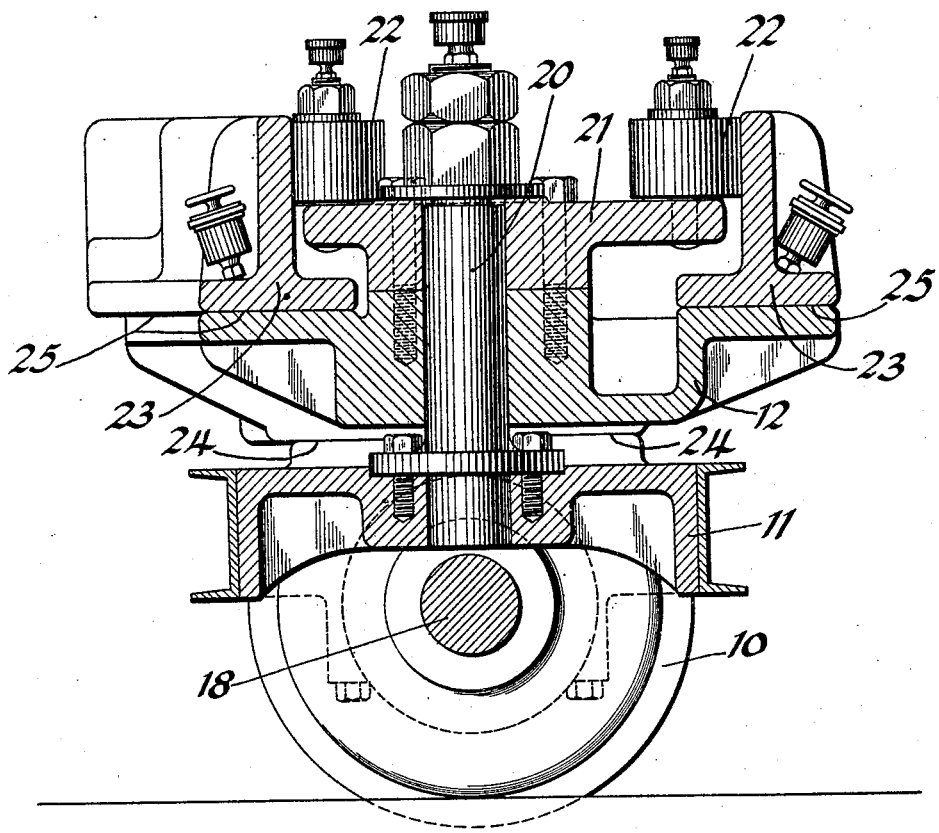

In the drawings: Figure 1 is a partial side and partial sectional elevation of a truck embodying my invention; Fig. 2 is a plan view of the truck shown in Fig. 1 with a portion of the freight carrying platform removed for convenience of illustration; Fig. 3 is a plan view of a portion of the truck and illustrates an arrangement of the pilot wheels; Fig. 4 is a section along the line A—A of Fig. 3; Fig. 5 is a section along the line B—B of Fig. 3; and, Fig. 6 is a diagrammatic illustration showing the relative positions of the wheels with respect to the truck when the truck is rounding a curve.

In the preferred embodiment of my invention, I employ a truck in which one pair of wheels is journaled in bearings fixed to the frame of the truck, and the other pair is journaled in a swivel frame which is pivotally secured to a swinging frame, the latter being laterally movable across the frame of the truck.

Referring to the drawings: The truck is provided with a frame 8 built up of I-beams and angles, a pair of driving wheels 9, journaled in bearings fixedly mounted on the frame, and a pair of pilot wheels 10, journaled in a swivel frame 11, which is pivotally secured to a swinging frame 12. The frame 8 supports a freight carrying platform 13, an electric motor 14, for operating the driving wheels 9, and a storage battery 15, for supplying current to the motor. The battery and motor are both located below the freight carrying platform.

The driving wheels 9 are rigidly mounted on a driving axle 16, which is journaled at each end in bearings 17, fixedly mounted on the frame 8 of the truck. The motor 14 is belted or otherwise swung from the frame 8 and drives the axle 16 through a chain of driving gears. The cells of the storage battery 15 are assembled in two groups, one of which is located ahead of the pilot wheels. Access may be had to the battery by removing portions of the freight carrying platform.

The pilot wheels 10 are rigidly mounted on an axle 18 which is journaled at each end in bearings 19 fixedly mounted on the swivel frame 11. The frame 11 is secured by means of a king pin 20 to a plate 21, which is secured to the swinging frame 12. The frame 12 is adapted to swing, through the arc of a circle, laterally across the frame 8 of the truck. In accomplishing this I provide the plate 21 with rollers 22 which coöperate with the vertical flanges of inverted T-bars 23, in guiding the swinging frame in its lateral motion across the frame 8 of the truck. The T-bars 23 are curved to form segments of concentric circles, the center of which is located above the axis of rotation of the driving wheels and midway between the wheels.

An ample bearing 24 is provided between the swivel frame 11 and the swinging frame 12, for the purpose of permitting the axle 18 of the pilot wheels 10 to turn freely about the king pin 20. An ample bearing 25, located between the frame 12 and the frame 8, and the rollers 22 are employed to reduce the friction, between the swinging frame 12 and the frame 8, to a minimum. The bearings 24 and 25 may be replaced by ball bearings if desirable.

With the construction illustrated the king pin and the frame 12 are capable of swinging freely across the frame 8 of the truck in the arc of a circle and the swivel frame 11 is capable of swinging freely about the king pin 20. Two sets of springs 26 are located between the frame 12 and the frame portion 8, and are so arranged that when the swinging frame is moved laterally, relative to the frame 8, from its normal or central position, one set of springs 26 is always thrown into tension and operates to return it to the normal position. The wheels 9 and 10 are each flanged on the outside instead of the inside, as is usually customary, and the thread is conical, its shortest diameter being located adjacent to the flange.

The operation of the truck is as follows: While the truck is operating on a tangent piece of track, the swinging frame 12 is in the normal position and the pin 20 and rollers 22 are located centrally of the ways and of the frame 8 of the truck. The flanges of the pilot wheels, while the wheels are rolling along straight track, cause the axle of the wheels to extend at right angles to the rails. Since the swing frame and consequently the king pin 20 are in their normal position, the axis of the car is parallel to the track and consequently the driving wheels 9 follow the rails and their axle 16 extends at right angles to the rails. Let it be supposed that the pilot wheels 10 are leading, that is, are in advance of the driving wheels 9, and that the truck encounters a curve in the track, such as is illustrated in Fig. 6. Under such conditions the inertia of the truck will tend to cause the frame of the truck to continue in the direction of the original motion, that is, in a straight line. The flanges of the pilot wheels 10 will, however, cause the wheels 10 to follow the curvature of the track and to move the swivel and the swinging frame laterally of the frame 8. As the truck continues around the curve the lateral or tangential displacement of the forward end of the truck, relative to the swinging frame or the pilot wheels, will continue to increase until one set of springs 26, in conjunction with the reaction of the flange of the inside driving wheel 9 against the inside rail, overcomes the inertia or the tangential force. The flanges and the coning of the pilot wheels cause the axle to turn about the king pin 20 and occupy radial positions relative to the curvature of the track, during the rounding of a curve, and consequently they will not materially increase the rolling friction. The springs 26, which are thrown into tension by the lateral displacement of the forward end of the frame 8, relieves the pressure of the flange of the inside wheel 9 against the inside rail, by overcoming, to some extent the force due to inertia of the truck and by drawing the forward end of the frame inwardly against the tangential force. This causes the axle 16 to assume a substantially radial position and consequently the driving wheels roll freely around the curve. The coning of the driving wheels assists in reducing the rolling friction as it tends to cause the wheels to roll freely in a curve. When the truck has passed around the curve and is again on a straight piece of track, the tension of the extended springs, together with the effort of the flanges of the driving wheels to move the driving axles to a position at right angles to the rails, draws the forward end of the frame portion of the truck to normal position and there is no force, while the truck is traversing a straight piece of track, which tends to displace it. The flanges of the wheels tend to maintain the wheel axles at right angles to the track, and consequently the external forces exerted on the truck tend rather to maintain the truck in the normal position relative to the king pin and the swing frame.

Upon approaching a curve with the pilot wheels following the driving wheels, the flange of the inside driving wheel tends to laterally displace the rear end of the truck by crowding the inside rail. This effort is supplemented by the coning of the wheels, which causes them to tend to follow the rails while rolling around a curve. As soon as the truck has advanced far enough around the curve for the rear end to be affected by the tangential force, the effort of the wheel flange to displace the rear end of the truck tangentially is supplemented and even replaced by the inertia or the tangential force of the truck. This force swings the rear end of the truck 8 outwardly and relieves the pressure of the flange of the inside driving wheel against the inside rail by turning the driving axle to a radial position relative to the curvature of the track. The lateral displacement of the rear end of the frame 8 throws one set of the springs 26 into tension. The strength of the springs is so adjusted as to prevent the inertia or the tangential force from causing too great a displacement of the frame. This tendency is also resisted by the flange of the outside driving wheel which after the truck has been turned through a certain angle, variable and dependent upon the curvature of the track, resists, by crowding the outer rail, a further displacement and tends to swing the rear end of the frame inwardly. By properly adjusting the springs and proportioning the different parts of the truck the rolling friction on curves may be materially decreased below that ordinarily encountered so that it is not much higher than that encountered on straight track.

With the construction described the wheels require a minimum amount of space and consequently there is sufficient space under the freight carrying platform of the truck in which to install the operating mechanisms of the truck.

The truck may be provided with more than one pair of fixed wheels so long as the center of the fixed wheel base is maintained at the center of oscillation of the swiveled truck, and the swivel truck may be provided with two pairs of wheels if desired. Inside flanged wheels may be substituted for the outside flanged wheels at the expense of efficiency, since the crowding and binding action of the inside flanges will be more severe than encountered with outside flanges.

Various arrangements may be employed without departing from the spirt of my invention.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. In combination, in a rail traversing truck, driving wheels fixedly attached at or near one end of the truck, bogie wheels arranged at or near the other end of the truck, a swinging frame to which said bogie wheels are freely pivoted, a constraining grooved guide-way for affording the frame a range of movement transversely of the truck, springs for centering the frame, and a battery and a motor arranged under the truck and spaced in respect to the wheels substantially as described.

2. In combination in a truck, driving wheels fixedly attached to the truck, bogie wheels, a frame to which the bogie wheels are freely pivoted and a guide groove carried by the truck to provide constrained lateral motion for the frame.

3. In a rail traversing truck, the combination of driving wheels fixedly attached to the truck, a single pair of outside flanged wheels and means for supporting the truck on the last named wheels, said means adapted to provide independent pivotal and lateral motions.

4. In a truck, the combination of driving wheels fixedly attached to the truck, bogie wheels pivotally mounted on a frame laterally movable in relation to the truck, and springs opposing the lateral motion of the frame.

In testimony whereof, I have hereunto subscribed my name this 28th day of September, 1908.

LOUIS H. FLANDERS.

Witnesses:
CHARLES W. McGHEE,
E. W. McCALLISTER.

Copies of this patent may be obtained for five cents each, by addressing the "Commissioner of Patents, Washington, D. C."